E. Peck.
Corn Planter.
Nº 38,979.        Patented Jan. 23, 1863.
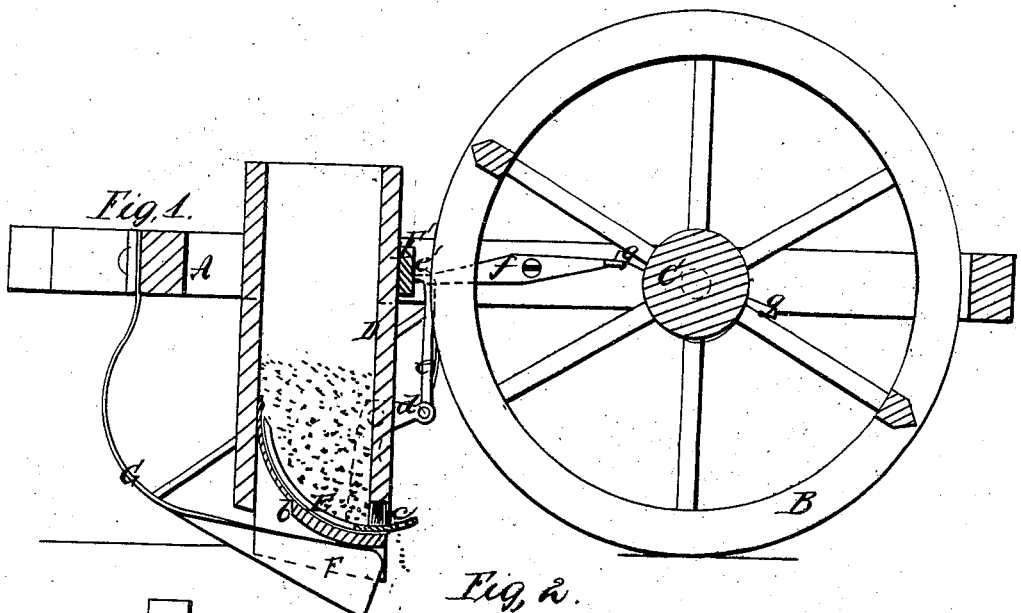
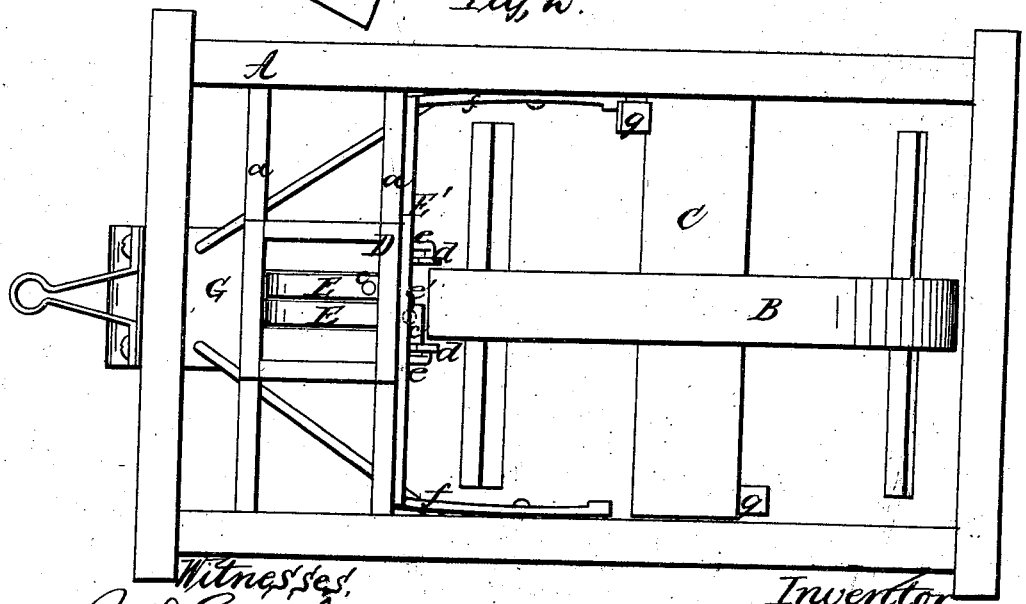
Witnesses:     Inventor
J. W. Coomb     Ezra Peck,
G. W. Reed     per Munn & Co
       Attorneys

UNITED STATES PATENT OFFICE.

EZRA PECK, OF MIDDLEPORT, ILLINOIS.

IMPROVEMENT IN CORN-PLANTERS.

Specification forming part of Letters Patent No. 38,979, dated June 23, 1863.

*To all whom it may concern:*

Be it known that I, EZRA PECK, of Middleport, in the county of Iroquois and State of Illinois, have invented a new and Improved Corn-Planter; and I do hereby declare that the following is a full, clear, and exact description of the same, reference being had to the accompanying drawings, forming part of this specification, in which—

Figure 1 represents a longitudinal vertical section of my invention. Fig. 2 is a plan or top view of the same.

Similar letters of reference indicate corresponding parts in both views.

This invention consists in the arrangement of a working-beam actuated by means of tappets projecting from the axle of the driving-wheels and acting on oscillating levers, in combination with segmental seed-slides connecting with the working-beam by bell-crank levers and suitable rods, and operating in the hopper in such a manner that by the action of the tappets on the hinged levers and rock-shaft the seed-slides are alternately forced up through the seed, acting as stirrers and filling their cells, and then drawn out to discharge the contents of their cells into a furrow drawn by a steel colter at the bottom of a sled-form standard supporting the front of the frame of the planter.

To enable those skilled in the art to make and use my invention, I will proceed to describe it with reference to the drawings.

A represents a frame, made of wood or any other suitable material, and supported in the rear by the axle C of the driving-wheel B.

D is the hopper, which is suspended from cross-bars a, and which extends nearly down to the ground. The bottom b of the hopper is made of a segmental piece of metal or other suitable material, which forms the support and guides for two or more segmental seed-slides, E. These slides extend up in the hopper, and their upper edges are chamfered off, so that they pass easily through the seed in the hopper. Each of the seed-slides E is provided with a seed-cell, c, to receive the seed and carry it out of the hopper into the furrows. The slides in passing through the seed stir the same and cause them to drop readily into the seed-cells, so that for every stroke the requisite quantity of seed is discharged. A reciprocating motion is imparted to the seed-slides by means of bell-crank levers d, which connect by rods e with a working-beam, E'. This beam has its fulcrum on a pivot, e', and it is actuated by levers f, which are secured to the inner sides of the longitudinal timbers of the frame, and one end of each of which catches into one of the fork-shaped ends of the working-beam. The other ends of the oscillating levers are flattened, and they are exposed to the action of tappets g, which project from the axle C, as clearly shown in the drawings. By the action of the tappets on the levers f an oscillating motion is imparted to the working-beam, and the seed-slides are alternately pushed in and drawn out of the hopper; and whenever one of the slides is drawn out the seed contained in its seed-cell is discharged into the furrow. The furrow is opened by the colter F, which projects from the under side of the curved sled-form standard G, that supports the front end of the frame A. Said standard is made of a flat plate of cast-iron or any other suitable material, which is firmly secured to the front cross-timber of the frame A. The colter F is made of steel, and projects from the lower surface of the standard G, just far enough to open the furrow to the desired depth, and the standard, and also the cutting-edge of the colter, are so shaped that the same pass readily over any obstructions that may come in the way.

This planter is very simple in construction, and it never fails to drop the requisite quantity of corn or other seed. The seed is discharged close to the ground from the seed-cell directly into the furrow and by the upward inclined position of the seed-slides all dirt or other impurities contained in the seed are compelled to work out, and the seed is stirred, causing the cells to fill with perfect regularity.

What I claim as new, and desire to secure by Letters Patent, is—

The arrangement of the working-beam E', levers f, and tappets g, in combination with rods e, bell-crank levers d, and segmental seed-slides E, all constructed and operating substantially as and for the purpose specified.

EZRA PECK.

Witnesses:
 GEO. W. LOVETT,
 H. W. TILLINGHAST.